United States Patent
Kelly

(10) Patent No.: US 9,166,470 B2
(45) Date of Patent: Oct. 20, 2015

(54) METHOD AND CIRCUIT FOR POWER FACTOR CORRECTION

(75) Inventor: Jamie Kelly, Tyne and Wear (GB)

(73) Assignee: TRIDONIC GmbH & CO. KG, Dornbim (AT)

( * ) Notice: Subject to any disclaimer, the term of this patent is extended or adjusted under 35 U.S.C. 154(b) by 880 days.

(21) Appl. No.: 13/384,117

(22) PCT Filed: Jul. 7, 2010

(86) PCT No.: PCT/EP2010/059685
§ 371 (c)(1),
(2), (4) Date: Feb. 2, 2012

(87) PCT Pub. No.: WO2011/009717
PCT Pub. Date: Jan. 27, 2011

(65) Prior Publication Data
US 2012/0133285 A1    May 31, 2012

(30) Foreign Application Priority Data
Jul. 23, 2009   (DE) .......................... 10 2009 034 350

(51) Int. Cl.
*H05B 37/00* (2006.01)
*H02M 1/42* (2007.01)
*H02M 3/156* (2006.01)
*H02M 1/00* (2007.01)

(52) U.S. Cl.
CPC ............ *H02M 1/4225* (2013.01); *H02M 3/156* (2013.01); *H02M 2001/0009* (2013.01); *Y02B 70/126* (2013.01)

(58) Field of Classification Search
None
See application file for complete search history.

(56) References Cited

U.S. PATENT DOCUMENTS

| 2008/0025056 A1* | 1/2008 | Chen | 315/247 |
| 2010/0225290 A1* | 9/2010 | Nalbant | 323/282 |
| 2010/0328976 A1* | 12/2010 | Melanson | 363/131 |

FOREIGN PATENT DOCUMENTS

| DE | 102004025597 A1 | 12/2005 |
| WO | WO-2007121944 A2 | 11/2007 |
| WO | WO-2007121945 A2 | 11/2007 |

OTHER PUBLICATIONS

International Search Report for PCT/EP2010/059685 dated Jun. 1, 2011.

(Continued)

*Primary Examiner* — Long Nguyen
(74) *Attorney, Agent, or Firm* — Marshall, Gerstein & Borun LLP

(57) ABSTRACT

A method and circuit for correcting a power factor in an alternating current/direct current power transformer. The circuit has an inductor fed by a rectified AC voltage, and a switch by which the inductor can be charged and discharged by closing and opening the switch, and further has a diode by which the discharge current of the inductor is fed to the output of the circuit. During the discharge phase, a voltage corresponding to the output voltage is measured, and the measured values are stored. It is further determined when the discharge current reaches or crosses the zero line at the end of a discharge phase. Switch-on and switch-off signals for actuating the switch are generated by analyzing the information determined. The switch should not be switched on again until a particular minimum switch-off time has been reached.

12 Claims, 6 Drawing Sheets

(56) References Cited

OTHER PUBLICATIONS

Infineon Technologies: "ICs for Consumer Electronics—Controller for Switch Mode Power Supplies Supporting Low Power Standby and Power Factor Correction, TDA16846/TDA 16847, Data Sheet," pp. 1-28 (Jan. 14, 2000).

National Semiconductor, "LF198/LF298/LF398, LF198A/LF398A Monolithic Sample-and-Hold Circuits," pp. 1-13 (Jul. 2000).

* cited by examiner

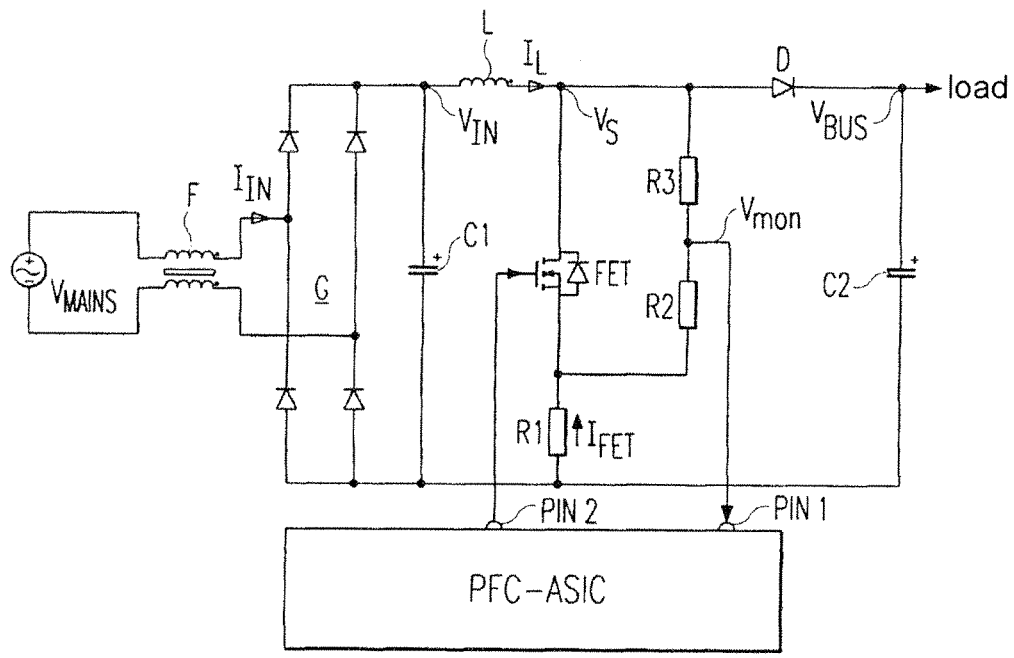
Fig. 1
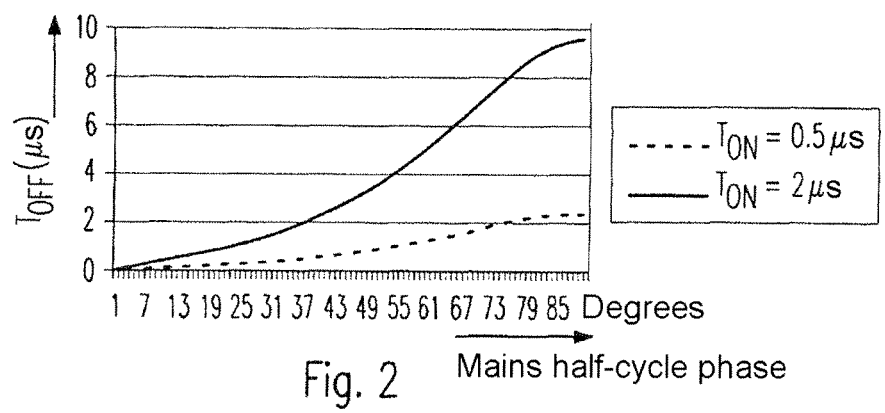
Fig. 2   Mains half-cycle phase

METHOD AND CIRCUIT FOR POWER FACTOR CORRECTION

BACKGROUND OF THE INVENTION

1. Field of the Invention

The present invention relates to a method and an apparatus for active power factor correction (PFC), i.e. by means of a switch clocked actively by a PFC control unit.

The technical field of the present invention is in particular that of power factor correction in AC/DC voltage power converters.

2. Related Technology

Power factor correction is used to influence the manner in which electrical appliances draw current from the power supply system. The AC mains voltage has a sinusoidal time profile, as is known. Ideally, therefore, the current drawn from the mains should also likewise have a sinusoidal time profile. This ideal case does not always arise, however, with it even being possible for the current to deviate considerably from a sinusoidal envelope. If the current drawn is not sinusoidal, harmonics are produced in the mains current, however. These harmonic currents in the supply system should be reduced with the aid of a power factor correction circuit.

DE 10 2004 025 597 A1 has disclosed a circuit for power factor correction, in which the inductor is charged and discharged repeatedly by means of a switch clocked by a PFC control unit by virtue of said switch closing and opening, and in which the discharging current of the inductor is supplied to the output of the converter via a diode (D). The PFC control unit in the form of an ASIC has only two pins. Control signals are output via one of the pins and parameters which are required for dimensioning the switch-on and switch-off time for the switch are monitored at the other pin. In this case, the switch is switched on again at the end of a switch-off time when the discharging current through the inductor has reached the zero line. This time is determined by monitoring the voltage on the high-potential side of the switch and is measured by means of a voltage divider, which is connected in parallel with the switch. The tap of the voltage divider forms a monitoring point, to be precise the only monitoring point, with said monitoring point being connected to the monitoring pin. The monitored voltage has a downwardly inflected time profile when the discharging current reaches the zero line. This event will be referred to below as a ZCD event (zero crossing detection).

In the known method and the known circuit, therefore, the DC output voltage can be monitored via the monitoring point when the switch is open. The DC output voltage can only be monitored as long as there is still current flowing through the diode, however. When the AC input voltage, i.e. the rectified and, as far as possible, smoothed mains voltage, which still comprises successive sinusoidal half-cycles of the same polarity, however, has a relatively low mean amplitude value, or when the load is low, the time segment within which the diode is conducting can be very short, with the result that the DC output voltage can only be sampled to an insufficient extent.

Circuits for power factor correction of the type under consideration here are normally regulated by virtue of the switch-on time $T_{ON}$ being altered. Given a predetermined load, $T_{ON}$ is theoretically constant over the entire angular range of 90 degrees of a mains half-cycle. However, when the load is reduced, $T_{ON}$ also needs to be reduced correspondingly. Even when the DC output voltage $V_{BUS}$ is monitored directly, the control range is restricted as a result of the abovementioned temporally very short sampling pulses. Under such low-load conditions, the procedure which has therefore been adopted in the meantime is that the power correction circuit has been switched off entirely when $V_{BUS}$ exceeds an upper voltage threshold and switched on again when $V_{BUS}$ exceeds a lower voltage threshold. With such hysteresis regulation, however, the desired sinusoidal form of the input current can be maintained.

SUMMARY OF THE INVENTION

The invention is therefore based on the object of specifying, for a method for power factor correction of the type under consideration here and for the corresponding circuit, possibilities for generating reliable sampled values even at a low AC input voltage and/or under low-load conditions and thus ensuring continuous regulation of the DC output voltage.

Accordingly, the invention provides a method for power factor correction for an AC/DC voltage converter, in which a DC voltage or a rectified AC input voltage feeds an inductor, in which the inductor is repeatedly charged and discharged by means of a clocked switch by virtue of the switch closing and opening, in which the discharging current from the inductor is supplied to the output of the converter via a diode, in which, during the discharge phase, a voltage $V_{mon}$ corresponding to the DC output voltage $V_{BUS}$ is detected, in which the temporal range is established at which the discharging current reaches or crosses the zero line at the end of a discharge phase, in which, while evaluating the determined information, switch-on and switch-off signals for clocking the switch are generated, and in which the switch is switched on again no earlier than after a specific minimum switch-off time has elapsed.

In one embodiment, the switch is switched on again no later than after a specific maximum switch-off time has elapsed.

In another embodiment, ZCD signals which are detected before the minimum switch-off time has elapsed cause the switch to switch on again when the minimum switch-off time has elapsed.

In one embodiment, ZCD signals which are detected once the minimum switch-off time has elapsed but before the maximum switch-off time has elapsed cause the switch to switch on again without a delay. Advantageously, in one embodiment, when no ZCD signals are detected before the maximum switch-on time has elapsed, the switch is switched on again when the maximum switch-off time has elapsed.

The invention also provides a power factor correction circuit for an inductor, which is fed by a DC voltage or a rectified AC input voltage, a clocked switch, by means of which the inductor is charged and discharged repeatedly by virtue of said switch closing and opening, a diode, via which the discharging current of the inductor is supplied to the output of the converter, means for sampling a voltage $V_{mon}$ corresponding to the DC output voltage $V_{BUS}$ during the discharge phase, means (Zero Cross Detector) for establishing the temporal range at which the discharging current reaches or crosses the zero line at the end of a discharge phase, means for evaluating the determined information and for generating switch-on and switch-off signals for clocking the switch, and timing means, which store the value for a specific minimum switch-off time for switching the switch on again and predetermine said value for generating the clock signal.

Preferably, the timing means additionally stores values for a specific maximum switch-off time and an interference suppression time for switching the switch on again and predetermine said values for generating the clock signal.

Highly preferably, the power factor correction circuit further contains an overcurrent comparator, with a voltage being supplied to one input of said comparator, the voltage representing, during the charging phase, the current flowing through the switch, with a voltage being supplied to the other input of the comparator, the voltage representing an upper threshold value for the current flowing through the switch, and the overcurrent comparator generating a switch-off signal for the switch when the current flowing through the switch reaches the threshold value.

In one embodiment, a series circuit comprising two resistors, which form a voltage divider, is provided upstream of the diode in parallel with the switch, in which this series circuit is connected in series with a shunt resistor, through which the current flowing through the switch during the charging phase is passed, and in which the node between the two resistors forming the series circuit forms a common node for monitoring circuit parameters, said node being connected to a control unit.

Preferably, in this embodiment the control unit is in the form of an ASIC with only one common monitoring pin and only one control pin.

The invention also provides a PFC-ASIC, containing functional modules of a power correction circuit and an FET controller whose one input is likewise with its one input likewise connected to the monitoring pin, whose other input is connected to the FET controller for the purpose of picking up a threshold value for the current flowing through the switch, and generates, at its output, a switch-off signal for the switch when the current flowing through the switch reaches the threshold value.

The invention also provides an operating device for light-emitting means, having an inventive power factor correction circuit and/or an inventive PFC-ASIC.

The invention further provides a luminaire, having an inventive operating device and one or more connected light-emitting means, such as gas discharge lamps, LEDs, or OLEDs.

BRIEF DESCRIPTION OF THE DRAWINGS

Exemplary embodiments will be described below with reference to the drawings, in which:

FIG. 1 shows a schematized circuit diagram of a circuit for power factor correction in an AC/DC voltage power converter;

FIG. 2 shows the dependence of the switch-off time $T_{OFF}$ on the phase of a sinusoidal half-cycle of the rectified AC input voltage $V_{IN}$;

DETAILED DESCRIPTION

Figure 3:
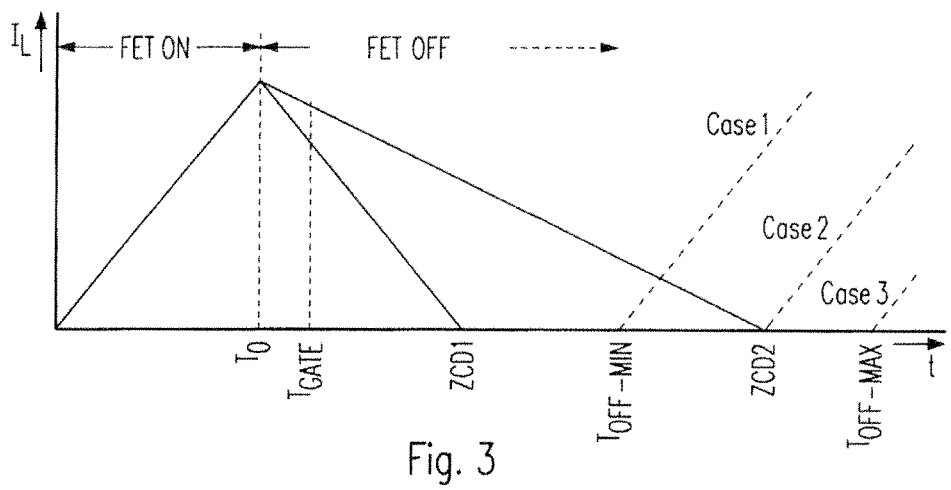
FIG. 3 shows a graphical representation of the current $I_L$ flowing through the inductor L as a function of time t with three different ZCD events.

The power correction circuit shown in FIG. 1 is supplied with the sinusoidal mains voltage $V_{MAINS}$ from the mains. Once it has passed a passive high-frequency filter F, said voltage is supplied to a bridge rectifier G. This results in a voltage comprising sinusoidal half-cycles of identical polarity being produced at the input capacitor C1. Although it could also be referred to as a DC input voltage which pulsates to a greater or lesser extent, it is referred to below as AC input voltage $V_{IN}$ precisely because of its ripple and the need to match the input current to its waveform.

In principle, the PFC circuit can also be supplied with power starting from a DC voltage instead of the mains AC voltage, as is the case in emergency lighting devices, for example.

The AC input voltage $V_{IN}$ is supplied to a series circuit comprising an inductor L, an electronic switch in the form of a FET and a shunt resistor R1. By virtue of repeated closing and opening of the switch or by virtue of the fact that the FET is clocked with perpetual repetition, the inductor L is charged and discharged correspondingly. The current flowing through the inductor in the individual phases is denoted by $I_L$.

The inductor L is connected to the output of the circuit, represented by the output capacitance C2, via a diode D. The load is connected across the output.

A series circuit comprising two resistors R2, R3, which are additionally connected in series with a shunt resistor R1, is connected in parallel with the FET. The shunt resistor R1 is also connected in series with the FET and has a much lower resistance value than R2 and R3. The node between the two resistors R2 and R3 with a higher resistance value is a common measuring point in the circuit for the parameters required for control. This common measuring point is connected to the single monitoring pin PIN 1 of a control unit PFC in the form of an ASIC. The ASIC also has a second pin, which is denoted as PIN 2 and is used for outputting control commands. In the present case, PIN 2 is connected to the gate of the FET and supplies the clock signals thereto, i.e. the commands to close or to open.

When the FET is conducting, the inductor is magnetically charged. The charging current $I_L$ then flows via the FET and the shunt resistor R1 to ground, with the result that the voltage drop across R1 is a measure of the charging current and therefore also of the current $I_{FET}$ flowing through the FET. This voltage drop is utilized during the charge phase for overcurrent monitoring and for calculating the AC input voltage $V_{IN}$. During the charge phase, the switched-on FET short-circuits the series circuit comprising the resistors R2, R3, with the result that $V_{mon}$ at PIN 1 is a measure of the current $I_{FET}$ flowing through the FET.

When the FET is switched off, the discharging current $I_L$ flows via the diode D to the load. The diode D is conducting during the discharge phase and correspondingly has a very low resistance. Nevertheless, the DC output voltage $V_{BUS}$ and the voltage $V_S$ in the form of a voltage drop across the FET upstream of the diode D differ from one another slightly by the voltage drop across the conducting diode D. The voltage difference between $V_{BUS}$ and $V_S$ is only significant when the discharging current $I_L$ approaches or crosses the zero line. In the case of this ZCD event, $V_S$ demonstrates a downwardly directed inflection in the voltage, while $V_{BUS}$ remains practically unchanged. The voltage $V_{mon}$ applied to PIN 1 during the discharge phase is a measure of the voltage $V_S$ in the form of a voltage drop across the series circuit comprising the resistors R1, R2, R3. $V_{mon}$ therefore represents the DC output voltage $V_{BUS}$ over the majority of the discharge phase and makes it possible to detect a ZCD event at the end of the discharge phase.

$V_{BUS}$ is the value which is intended to be kept constant by means of regulation. It therefore needs to be available in digital form as an actual value not only during the discharge phase but also during the charge phase. Since, however, measurement is only possible in the discharge phase, $V_{BUS}$ is sampled by the PFC-ASIC during the discharge phase, and is converted into a corresponding digital value and stored.

For effective monitoring of $V_{BUS}$, the switch-off time $T_{OFF}$ needs to be long enough for the sampling. FIG. 2 shows the switch-off time $T_{OFF}$ as a function of the phase angle of a sinusoidal half-cycle of the AC input voltage $V_{IN}$, which has a frequency of 100 Hz. In this case, the amplitude of the AC input voltage $V_{IN}$ (corresponding to the mains voltage) should have a peak value of 230 V, and the DC output voltage $V_{BUS}$ should have a mean value of 400 V. In the case of a relatively low DC input voltage $V_{IN}$ or a relatively high DC output voltage $V_{BUS}$, the switch-off time is reduced further. A relatively large phase angle means a relatively high DC input voltage $V_{IN}$.

In order to be able to sample $V_{BUS}$ satisfactorily, a minimum switch-off time $T_{OFF}$ of 2 is assumed. This would mean that one 1 would remain, within which the FET drain voltage reaches the voltage value of $V_{BUS}$ and can assume this value. It is clear from FIG. 2 that $V_{BUS}$ sampling pulses cannot be generated over the entire phase angle range. However, when it is possible for sampling pulses to be generated at least over a considerable proportion of the phase angle range, this is sufficient for regulating $V_{BUS}$. When $T_{ON}$=0.5 µs, $T_{OFF}$ is above 2 only over a very small proportion of the phase angle range. When, on the other hand, $T_{ON}$=2, $T_{OFF}$ is above 2 over virtually 60% of the phase angle range. Firstly, there is therefore obviously the problem of how to make regulation possible over a sufficiently large proportion of the phase angle range under low-load conditions (resulting in a low $T_{ON}$). A second problem is that of how it is possible to guarantee that sampled values taken from $V_{BUS}$ can be considered as reliable.

One solution to the first problem will be explained below with reference to FIG. 3. The solution consists in extending the switch-off time $T_{OFF}$ beyond the time at which the diode D ceases to be conducting. This means, for example, that even when $T_{OFF}$ is restricted to a temporal range of only 2-2.5, the entire temporal range available for the regulation can be much greater.

In FIG. 3, all of the times are related to $T_0$, namely the time at which the FET switches off, i.e. becomes non-conducting. Within the time period delimited by $T_0$ and $T_{GATE}$, the FET cannot switch on again, i.e. become conducting. This is intended to prevent the FET from switching on again as a result of a fault which has been caused by the FET switching off. $T_{GATE}$ can therefore be referred to as the interference suppression time and needs to be selected such that it is long enough to avoid erroneous triggering and is short enough to be able to detect reliable trigger signals, in particular when said signals are taken close to the ZCD crossing point, at which the discharging current reaches or crosses the zero line. When a reliable trigger signal falls within the temporal range delimited by $T_{GATE}$, the FET should not switch on again until time $T_{OFF-MAX}$. For the simulation yet to be explained below, a value of 0.5 µs has been assumed for $T_{GATE}$.

If an event ZCD1 is detected before $T_{OFF-MIN}$ has elapsed (Case1), the FET should not be switched on again without delay. Instead, the control circuit should wait until $T_{OFF-MIN}$ and only then switch on the FET again.

If no ZCD event is detected before $T_{OFF-MIN}$ has been reached (Case2), the FET should not be switched on again. The circuit should then continue to operate up to time ZCD2, at which a ZCD event is detected. Then, the FET should be switched on again without a delay.

When no ZCD event is still detected even after $T_{OFF-MIN}$, the FET should be switched on again at time $T_{OFF-MAX}$ (Case3). This ensures that the PFC does not cease to function. In the simulation yet to be explained, a value of 150 µs has been assumed for $T_{OFF-MAX}$.

Figure 4A:
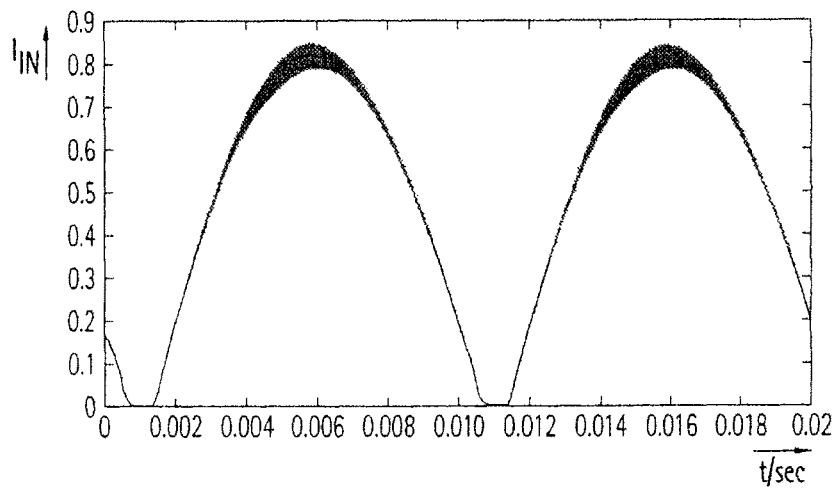
FIGS. 4 (a)-(c) show three oscillograms showing the time profile of the input current $I_{IN}$ given different parameters.
Figure 4B:
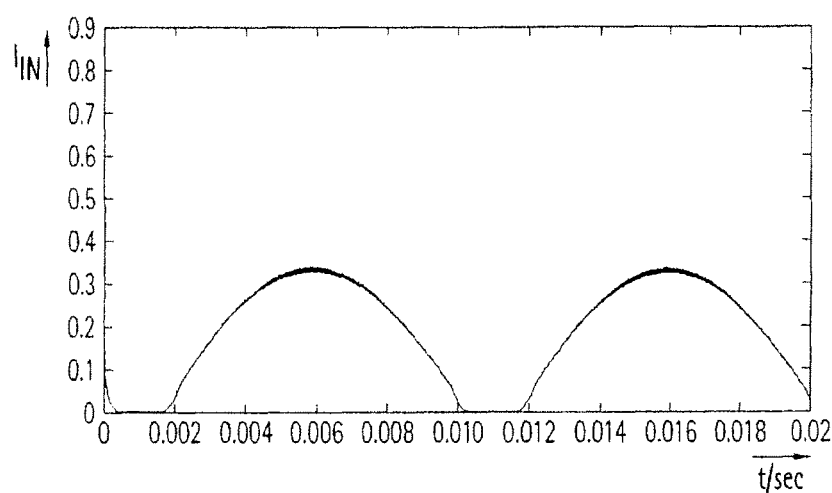
Figure 4C:
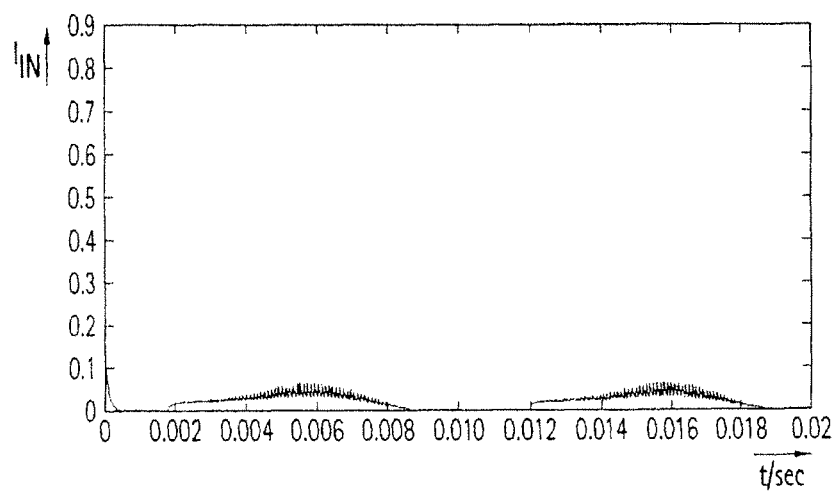

The time profiles shown in FIG. 4 for input currents $I_{IN}$ for various load conditions have been generated by a simulator, with only the following comments being made in relation to the simulator for reasons of simplicity. The simulator is connected to the monitoring point between the resistors R2 and R3 in FIG. 1 and contains a ZCD detector and an overcurrent detector. Both evaluate the voltage $V_{mon}$ present at the monitoring point. In addition, the simulator is connected to two control inputs. $T_{ON}$ can be set at one of these control inputs, and $T_{OFF-MIN}$ can be set at the other. $T_{ON}$ is varied over a limited range in order to ensure that $V_{BUS}$ can be sampled effectively. $T_{OFF-MIN}$ is increased when the load is low. The variation range of $T_{OFF-MIN}$ is between 1-150 µs.

The three simulation results in FIG. 4 show the input current $I_{IN}$ given three different loads over a variation range of approximately 20:1. It can be seen that the regulation is effective over the entire range since all three input currents $I_{IN}$ illustrated simulate a sinusoidal waveform. This is possible without it being necessary for the PFC mode to be switched off under low-load conditions. Such a result could hardly be achieved with a system in which only $T_{ON}$ is varied as a manipulated variable.

In the above-described control system, however, there is the risk of faults occurring in the waveform of the current $I_L$ when $T_{OFF-MIN}$ is increased. As will be shown below, this does not need to be the case.

Figure 5:
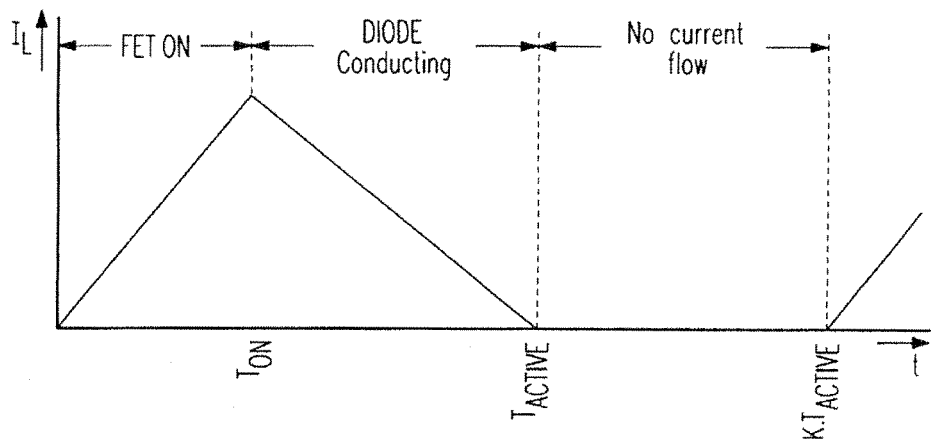
FIG. 5 shows a further graphical representation of the current $I_L$ flowing through the inductor L as a function of time t in a different view than that in FIG. 3.

FIG. 5 illustrates a time $T_{ACTIVE}$ which defines the end of the time segment in which the diode D is conducting. In addition, a time $K \cdot T_{ACTIVE}$, where K>1, is specified in said figure, which defines the end of a time segment which includes a smaller time segment in which there is no current flowing either through the diode D or through the FET.

The mean value $I_{AV}$ of the current $I_L$ during the time segment defined by $K \cdot T_{ACTIVE}$ is as follows:

$$I_{AV} = I_{PEAK}/2 \cdot K,$$

where $I_{PEAK}$ is the peak current of the current $I_L$.

By maintaining K as the constant factor over the 90 degrees phase range of the AC input voltage, the mean value of the current $I_{AV}$ can be reduced without any interference occurring in the waveform of the current. $T_{OFF-MIN}$ is now variable and is calculated as follows:

$$T_{OFF-MIN} = K \cdot T_{ACTIVE} - T_{ON}$$

Since $T_{ACTIVE}$ can be measured and $T_{ON}$ is known, $T_{OFF-MIN}$ can be calculated easily. It is possible to perform the calculation within the present clock, with the calculation operation being ended by a ZCD event and the event being introduced into the control operation within a few subsequent clocks.

As an alternative to this, a measurement which has been performed within a preceding clock can be used during the present clock for a calculation when there is thus more time available.

Figure 6:
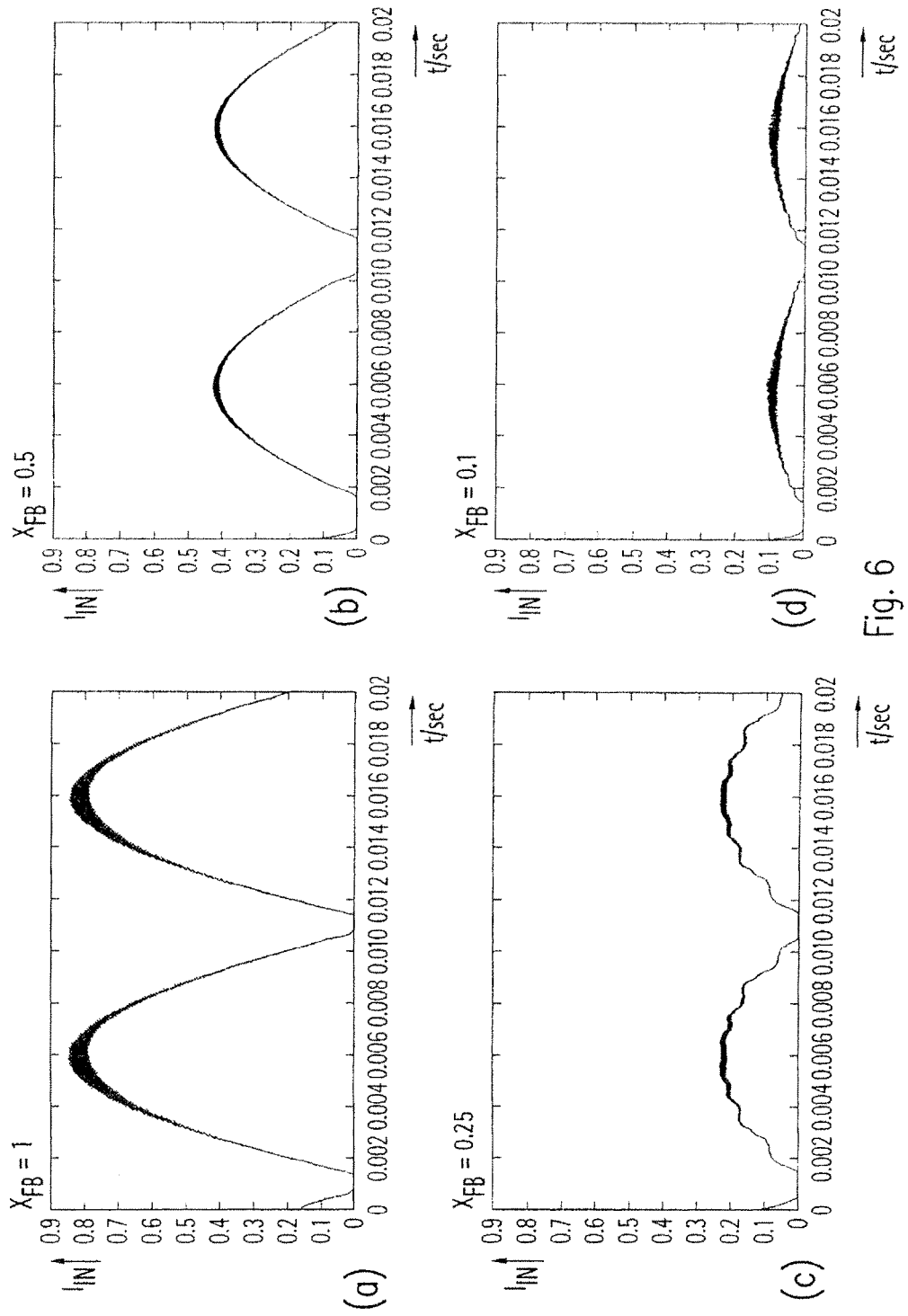
FIGS. 6 (a)-(d) show four oscillograms showing the time profile of the input current $I_{IN}$ given different parameters other than those in FIG. 5.
Figure 7A:
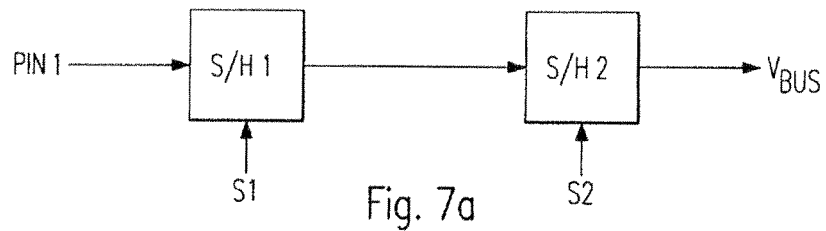
FIGS. 7 (a) and (b) show a circuit arrangement of two series-connected sample-and-hold circuits for determining $V_{BUS}$ with the corresponding timing diagrams.
Figure 7B:
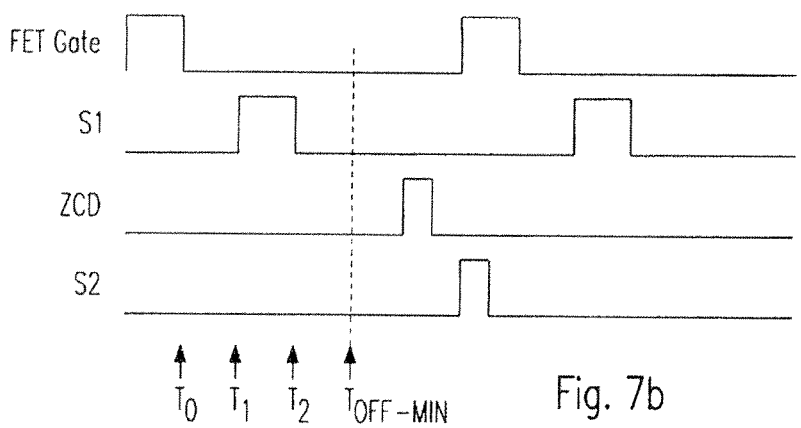
Figure 8:
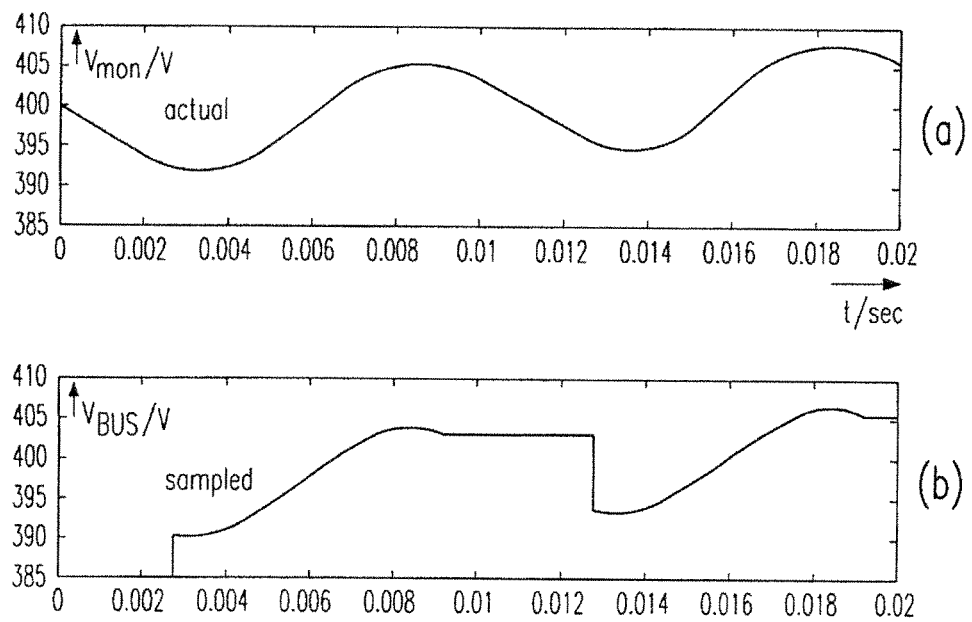
FIG. 8 shows two graphs, of which one shows the time profile of the actual monitored voltage $V_{BUS}$ and the other shows the time profile of the sampled DC output voltage $V_{BUS}$.

FIG. 6 shows the simulated waveforms of the input current $I_{IN}$ as a function of time t for a PFC controller, wherein the adjustment range for $T_{ON}$ is 2-5 and $K_{MAX}$ is limited to the value 15. An entire range of 30:1 is possible when K is limited to 15 and $T_{OFF-MAX}$ is limited to 150 μs.

If the ZCD signal were to appear before time $T_{GATE}$ (not illustrate), it would not be taken into consideration. In this case, the switch-off time $T_{OFF}$ for the FET could be extended to $T_{OFF-MAX}$ (likewise not illustrated), provided that noise or another interference signal, such as ringing, for example, has not produced a false ZCD trigger signal at the drain electrode of the FET. An interference signal caused by ringing at the drain electrode of the FET has the same effect as a large number of false ZCD trigger signals. As long as a false trigger signal is produced prior to $T_{OFF-MIN}$, there is no reversal effect during sampling. For ringing it is probable that false ZCD trigger signals are generated up to $T_{OFF-MIN}$. As a result of general noise, on the other hand, false ZCD trigger signals could be generated anywhere.

Figure 9:
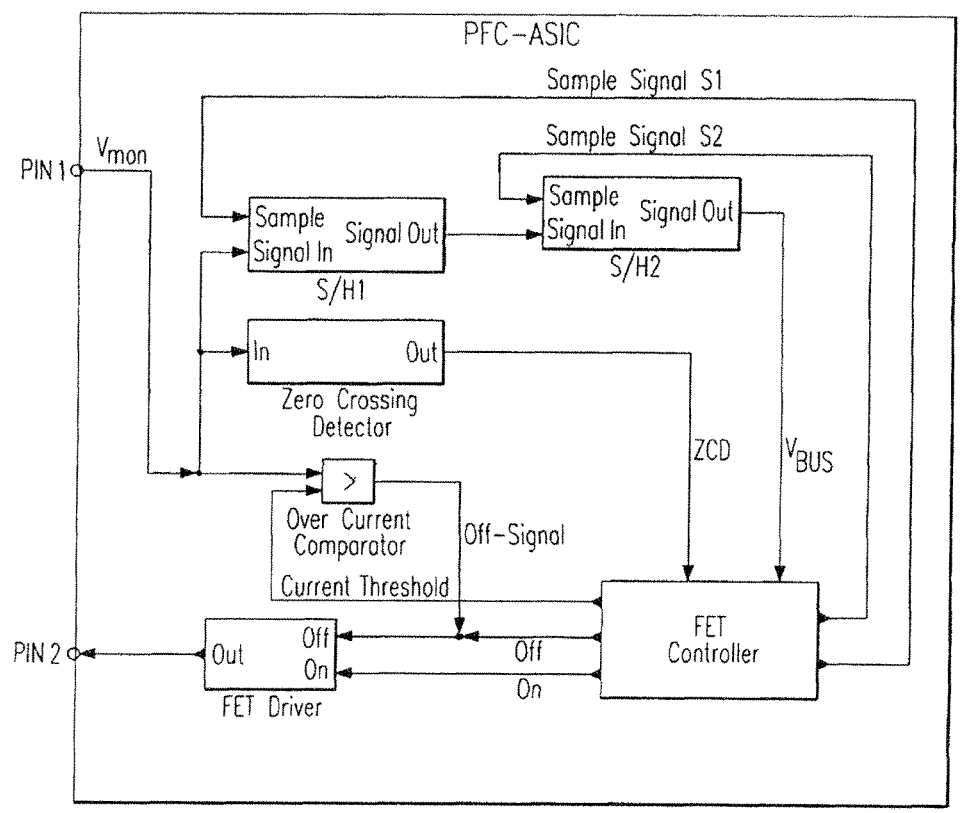
FIG. 9 shows a simplified illustration of the PFC-ASIC shown in FIG. 1.

A PFC-ASIC could in principle be constructed as follows and as shown in FIG. 9 on the basis of the above-explained knowledge. The voltage $V_{mon}$ is present at the single monitoring PIN 1. This voltage represents the current $I_{FET}$ flowing through the FET during the charge phase. This current is supplied to one input of an overcurrent comparator. A current threshold value signal is supplied by the FET controller to the other input. The comparator compares the signals and outputs a switch-off signal for the FET at the FET driver when the current threshold value is exceeded.

$V_{mon}$ is also evaluated during the discharge phase. The output product is the sampled DC output voltage $V_{BUS}$. This is supplied to the FET controller, which stores it as an actual value for the control of the DC output voltage, with the result that it is also available during the charge phase.

Finally, $V_{mon}$ is also evaluated by means of a ZCD (zero crossing detector), which responds to the negative inflection in the voltage $V_{mon}$ occurring at the end of the discharge phase and generates a ZCD signal, which is likewise supplied to the FET controller.

The FET controller processes the signals supplied thereto and generates from said signals a switch-on signal On for the FET, which it then supplies to the FET driver. The FET driver for its part passes the switch-on signals On and the switch-off signals Off onto the control PIN 2, from where the FET is switched.

The FET controller calculates, on the basis of the information available to it, when the FET needs to be switched on again at the end of a discharge phase, possibly with a delay, and when it needs to be switched off so as to end a charge phase. Correspondingly, it generates switch-on signals On and switch-off signals Off which it supplies to the FET driver, which then for its part switches the FET on or off via PIN 2. The calculation of a possible delay of $T_{OFF}$ is performed as has been explained above in connection with FIGS. 3 and 5.

Information relating to possible low-load conditions is provided to the FET controller from the monitoring of $V_{BUS}$. The information relating to the AC input voltage $V_{IN}$ is provided to the FET controller by evaluation of $I_{FET}$ during the charge phase via the two sample-and-hold circuits.

The invention claimed is:

1. A method for power factor correction for a voltage converter, wherein
   a DC voltage or a rectified AC input voltage feeds an inductor,
   the inductor is repeatedly charged and discharged by a clocked switch by virtue of said switch closing and opening,
   a discharging current from the inductor is supplied to an output of the converter via a diode,
   during the discharge phase, a voltage corresponding to a DC output voltage is detected,
   a temporal range is established at which the discharging current reaches or crosses a zero line at the end of a discharge phase,
   while evaluating the detected output voltage, and the time when the discharging current reaches or crosses the zero line, switch-on and switch-off signals for clocking the switch are generated, and
   the switch is switched on again no earlier than after a specific minimum switch-off time of the switch has elapsed and no later than after a specific maximum switch-off time of the switch has elapsed,
   wherein zero crossing detector signals are detected once the minimum switch-off time has elapsed but before the maximum switch-off time has elapsed and cause the switch to switch on again without a delay.

2. A power factor correction circuit comprising
   (a) an inductor, which is fed by a DC voltage or a rectified AC input voltage,
   (b) a clocked switch, by which the inductor is charged and discharged repeatedly by virtue of said switch closing and opening,
   (c) a diode, via which a discharging current of the inductor is supplied to an output of the converter,
   (d) means for sampling a voltage corresponding to a DC output voltage during a discharge phase,
   (e) means for establishing a temporal range at which the discharging current reaches or crosses a zero line at the end of the discharge phase,
   (f) means for evaluating the detected output voltage, and the time when the discharging current reaches or crosses the zero line and for generating switch-on and switch-off signals for clocking the switch,
   (g) timing means that store the value for a specific minimum switch-off time for switching the switch on again and predetermine said value for generating a clock signal,
   (h) a series circuit comprising two resistors, which form a voltage divider, is provided upstream of the diode in parallel with the switch,
   (i) the series circuit is connected in series with a shunt resistor, through which current flowing through the switch during the charging phase is passed, and
   (j) a node between the two resistors forming the series circuit forms a common node for monitoring circuit parameters, said node being connected to a control unit.

3. The power factor correction circuit as claimed in claim 2, wherein the timing means additionally store values for a specific maximum switch-off time of the switch and an interference suppression time for switching the switch on again and predetermine said values for generating the clock signal.

4. The power factor correction circuit as claimed in claim 2, further containing an overcurrent comparator, with the sampled voltage of (d) being supplied to one input of said comparator, said sampled voltage representing, during a charging phase, the current flowing through the switch, with a threshold voltage being supplied to another input of said comparator, said threshold voltage representing an upper threshold value for current flowing through the switch, and said overcurrent comparator generating a switch-off signal for the switch when the current flowing through the switch reaches the threshold value.

5. The power factor correction circuit as claimed in claim 2, in which the control unit is in the form of an ASIC with only one common monitoring pin and only one control pin.

6. A PFC-ASIC, containing:
(a) functional modules of a power correction circuit comprising
(i) an inductor, which is fed by a DC voltage or a rectified AC input voltage,
(ii) a clocked switch, by which the inductor is charged and discharged repeatedly by virtue of said switch closing and opening,
(iii) a diode, via which a discharging current of the inductor is supplied to an output of the converter,
(iv) means for sampling a voltage corresponding to a DC output voltage during a discharge phase,
(v) means for establishing a temporal range at which the discharging current reaches or crosses a zero line at the end of the discharge phase,
(vi) means for evaluating the detected output voltage, and the time when the discharging current reaches or crosses the zero line and for generating switch-on and switch-off signals for clocking the switch,
(vii) timing means that store the value for a specific minimum switch-off time for switching the switch on again and predetermine said value for generating the clock signal,
(viii) a series circuit comprising two resistors, which form a voltage divider, is provided upstream of the diode in parallel with the switch,
(ix) the series circuit is connected in series with a shunt resistor, through which current flowing through the switch during the charging phase is passed, and
(x) a node between the two resistors forming the series circuit forms a common node for monitoring circuit parameters, said node being connected to a control unit, and
(b) an FET controller having one input connected to a monitoring pin, with another input connected to the FET controller for the purpose of picking up a threshold value for the current flowing through the switch, and which generates, at an FET controller output, the switch-off signal for the switch when the current flowing through the switch reaches the threshold value.

7. An operating device for light-emitting means, having a power factor correction circuit comprising
(a) an inductor, which is fed by a DC voltage or a rectified AC input voltage,
(b) a clocked switch, by which the inductor is charged and discharged repeatedly by virtue of said switch closing and opening,
(c) a diode, via which a discharging current of the inductor is supplied to an output of the converter,
(d) means for sampling a voltage corresponding to a DC output voltage during a discharge phase,
(e) means for establishing a temporal range at which the discharging current reaches or crosses a zero line at the end of the discharge phase,
(f) means for evaluating the detected output voltage, and the time when the discharging current reaches or crosses the zero line and for generating switch-on and switch-off signals for clocking the switch,
(g) timing means that store the value for a specific minimum switch-off time for switching the switch on again and predetermine said value for generating the clock signal,
(h) a series circuit comprising two resistors, which form a voltage divider, is provided upstream of the diode in parallel with the switch,
(i) the series circuit is connected in series with a shunt resistor, through which current flowing through the switch during the charging phase is passed, and
(j) a node between the two resistors forming the series circuit forms a common node for monitoring circuit parameters, said node being connected to a control unit.

8. A luminaire comprising an operating device for light-emitting means having
(a) a power factor correction circuit comprising
(i) an inductor, which is fed by a DC voltage or a rectified AC input voltage,
(ii) a clocked switch, by which the inductor is charged and discharged repeatedly by virtue of said switch closing and opening,
(iii) a diode, via which a discharging current of the inductor is supplied to an output of the converter,
(iv) means for sampling a voltage corresponding to a DC output voltage during a discharge phase,
(v) means for establishing a temporal range at which the discharging current reaches or crosses a zero line at the end of the discharge phase,
(vi) means for evaluating the detected output voltage, and the time when the discharging current reaches or crosses the zero line and for generating switch-on and switch-off signals for clocking the switch,
(vii) timing means that store the value for a specific minimum switch-off time for switching the switch on again and predetermine said value for generating the clock signal,
(viii) a series circuit comprising two resistors, which form a voltage divider, is provided upstream of the diode in parallel with the switch,
(ix) the series circuit is connected in series with a shunt resistor, through which current flowing through the switch during the charging phase is passed, and
(x) a node between the two resistors forming the series circuit forms a common node for monitoring circuit parameters, said node being connected to a control unit, and
(b) one or more connected light-emitting means.

9. A luminaire as claimed in claim 8, wherein the light-emitting means is selected from the group consisting of gas discharge lamps, LEDs, and OLEDs.

10. An operating device for light-emitting means, having a PFC-ASIC, containing
(a) functional modules of a power correction circuit comprising
(i) an inductor, which is fed by a DC voltage or a rectified AC input voltage,
(ii) a clocked switch, by which the inductor is charged and discharged repeatedly by virtue of said switch closing and opening,
(iii) a diode, via which a discharging current of the inductor is supplied to an output of the converter,
(iv) means for sampling a voltage corresponding to a DC output voltage during a discharge phase,
(v) means for establishing a temporal range at which the discharging current reaches or crosses a zero line at the end of the discharge phase,
(vi) means for evaluating the detected output voltage, and the time when the discharging current reaches or crosses the zero line and for generating switch-on and switch-off signals for clocking the switch, (vii) timing means that store the value for a specific minimum switch-off time for switching the switch on again and predetermine said value for generating the clock signal,
(viii) a series circuit comprising two resistors, which form a voltage divider, is provided upstream of the diode in parallel with the switch,
(ix) the series circuit is connected in series with a shunt resistor, through which current flowing through the switch during the charging phase is passed, and
(x) a node between the two resistors forming the series circuit forms a common node for monitoring circuit parameters, said node being connected to a control unit, and
(b) an FET controller having one input connected to a monitoring pin, with another input connected to the FET controller for the purpose of picking UP a threshold value for the current flowing through the switch, and which generates, at an FET controller output, the switch-off signal for the switch when the current flowing through the switch reaches the threshold value.

11. A luminaire, having
(A) an operating device for light-emitting means, having a PFC-ASIC, containing
(a) functional modules of a power correction circuit comprising
(i) an inductor, which is fed by a DC voltage or a rectified AC input voltage,
(ii) a clocked switch, by which the inductor is charged and discharged repeatedly by virtue of said switch closing and opening,
(iii) a diode, via which a discharging current of the inductor is supplied to an output of the converter,
(iv) means for sampling a voltage corresponding to a DC output voltage during a discharge phase,
(v) means for establishing a temporal range at which the discharging current reaches or crosses a zero line at the end of the discharge phase,
(vi) means for evaluating the detected output voltage, and the time when the discharging current reaches or crosses the zero line and for generating switch-on and switch-off signals for clocking the switch,
(vii) timing means that store the value for a specific minimum switch-off time for switching the switch on again and predetermine said value for generating the clock signal,
(viii) a series circuit comprising two resistors, which form a voltage divider, is provided upstream of the diode in parallel with the switch,
(ix) the series circuit is connected in series with a shunt resistor, through which current flowing through the switch during the charging phase is passed, and
(x) a node between the two resistors forming the series circuit forms a common node for monitoring circuit parameters, said node being connected to a control unit, and
(b) an FET controller having one input connected to a monitoring pin, with another input connected to the FET controller for the purpose of picking UP a threshold value for the current flowing through the switch, and which generates, at an FET controller output, the switch-off signal for the switch when the current flowing through the switch reaches the threshold value, and
(B) one or more connected light-emitting means.

12. A luminaire as claimed in claim 11, wherein the light-emitting means is selected from the group consisting of gas discharge lamps, LEDs, and OLEDs.

* * * * *